June 12, 1951 K. F. ROSS 2,557,038

PHASE DISCRIMINATOR

Filed Oct. 20, 1947

INVENTOR
KARL F. ROSS
BY A. John Michel
ATTORNEY

Patented June 12, 1951

2,557,038

UNITED STATES PATENT OFFICE 2,557,038

PHASE DISCRIMINATOR

Karl F. Ross, Bronx, N. Y.

Application October 20, 1947, Serial No. 780,982

13 Claims. (Cl. 250—27)

The present invention relates to phase discriminators.

An object of the invention is to provide a phase discriminator which is self-adjusting on drifts of the received wave from a normal or zero modulation frequency.

Another object of the invention is to provide a phase discriminator which does not require the transmission of a reference wave along with the phase modulated wave.

A further object of the invention is to provide a phase discriminator utilizing principles which were disclosed in my co-pending United States patent application Serial No. 737,907, filed March 28, 1947, now U. S. Patent No. 2,530,081, granted November 14, 1950 in which the modulating signal is reproduced in the output of a relaxation oscillator or sawtooth wave generator.

In frequency discrimination, as described in my above-identified application, the audio signal which modulates the frequency of a carrier wave may be reproduced by triggering a relaxation oscillator in such a manner that the beginning of the leading edge of a sawtooth occurs at the instant when the carrier wave goes through zero, the trailing edge occurring practically instantaneously immediately before the beginning of the next sawtooth, i. e. when the carrier wave goes again through zero (thus, either after a full or a half cycle of the carrier wave). If the leading edge of a sawtooth is represented by the charging of a condenser, followed by the discharge of the condenser to a fixed level, the train of sawtooth oscillations will have an envelope which faithfully follows that of the modulating signal, hence is obtainable by conventional amplitude detection methods.

I have further found that a similar method may be used to reproduce the modulating signal of a phase modulated wave, provided the relaxation oscillator is modified in such a manner that the discharge level of the condenser is variable but that the magnitude of the charge dissipated during each trailing edge remains the same.

The above and other features and objects will appear more clearly from the following description, taken in conjunction with the accompanying drawing in which:

Figs. 1*a* through 1*d* are a set of graphs used to explain the principles of the invention;

Figures 4A, 4B, 4C:
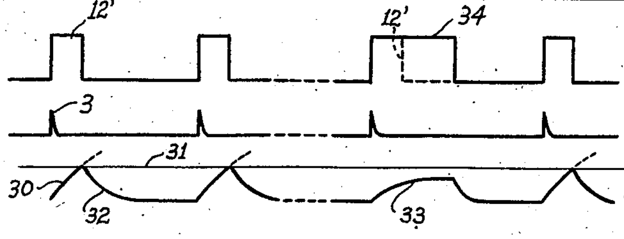

Figs. 4*a* through 4*c* are graphs used to explain certain characteristics of the invention.

Figures 1A, 1B, 1C, 1D:
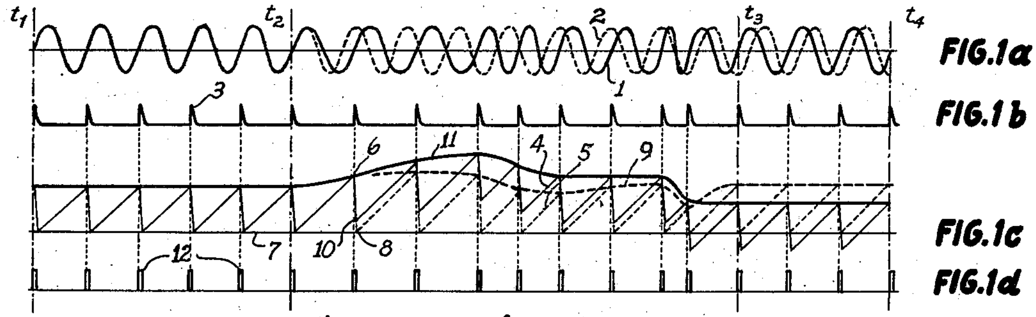

Referring to Fig. 1*a*, there is shown a carrier wave 1, of constant amplitude, which is shown in full lines and is modulated in phase in respect to a constant amplitude, constant phase (hence, constant frequency) reference wave 2, shown in dotted lines. Between time limits $t1$ and $t2$, when no modulation is present, the waves 1 and 2 are in phase. Between limits $t2$ and $t3$ the frequency of wave 1 varies due to modulation, as does the phase of wave 1 relative to wave 2. Between limits $t3$ and $t4$ the frequency of wave 1 is constant and equal to the reference frequency of wave 2, but the phase difference between the two waves, while constant, is not zero. This condition corresponds to the presence of a D.-C. modulating signal, e. g. the top of a rectangular pulse.

At 3, Fig. 1*b*, there is shown a train of sharp pulses each of which occurs at an instant when the wave 1 goes through zero. Such pulses may be derived from the carrier wave 1 by a differentiation circuit, in known manner and as more fully set forth in my above-mentioned co-pending application. The spacing between pulses 3 corresponds to the period of the modulated carrier wave 1, each pulse 3 occurring when the sign of the carrier voltage changes from negative to positive. By an obvious modification, using full-wave instead of half-wave rectification before the differentiation circuit, the spacing between pulses could be reduced to half a period, i. e. the number of pulses 3 per time interval could be doubled.

Referring to Fig. 1*c*, there is shown in full lines a sawtooth wave 4 generated by means of the pulses 3 in accordance with the method of the present invention, and there is further shown in dotted lines, for the purpose of comparison, a sawtooth wave 5 derived from the same pulses by the frequency discrimination method disclosed in my earlier application. As is to be expected, the lines 4 and 5 coincide in the interval between times $t1$ and $t2$ in which neither phase nor frequency modulation is present. At the time $t2$ (or stated more accurately, at an instant shortly thereafter when the trailing edge of the preceding sawtooth has been completed) there begins the leading edge of a sawtooth which may be thought of as the linear charging of the condenser, reaching its peak at point 6 when the next pulse 3 occurs. If the method of frequency discrimination above referred to were followed, the condenser would discharge to a fixed level represented by the base line 7 of the sawtooth wave.

hence the trailing edge would terminate and the new sawtooth start at the point 8. Continuing in the same manner, one obtains the dotted sawtooth line 5 having an envelope 9.

In accordance with the present invention, now, the discharge of the condenser is carried only to the point 10 at which the amplitude of the trailing edge (the distance between the points 6 and 10) is the same as it was in the interval $t1$—$t2$ (i. e. the distance between lines 7 and 11 within that interval, 11 being the envelope of the sawtooth wave 4 shown in full lines). While a certain similarity will be found to exist between the envelopes 9 and 11 in the interval $t2$—$t3$, there is complete divergence in the period $t3$—$t4$ where the frequency discrimination line 9 returns to zero signal position (the position occupied in the interval $t1$—$t2$) whereas the phase discrimination line 11 faithfully reproduces the D.-C. modulating signal previously mentioned. Thus, while in the interval $t2$—$t3$ the phase modulation signal could be detected by the well known method of frequency discrimination followed by amplitude distortion as a function of the modulating frequency, this method would fail in the interval $t3$—$t4$ where the modulating frequency is zero. Thus it will be seen that the method according to the invention permits of a more accurate reproduction of the original signal than has been possible with conventional methods.

Fig. 1*d* illustrates a possible method of obtaining the sawtooth wave 4 of Fig. 1*c*. This method comprises the step of generating a train of rectangular pulses 12 the leading edge of which coincides with that of respective pulses 3. Pulses 12 determine the time during which a condenser in the relaxation oscillator, which was charged in linear manner during the leading edge of the sawtooth, may be discharged by way of a constant current device. In this manner the charge lost by the condenser during each trailing edge of the sawtooth wave (expressed in coulombs) will be constant as will be the decrease in the voltage across the condenser. The resulting condenser voltage over a succession of charges and discharges will have the form of the sawtooth wave 4.

Figure 2:
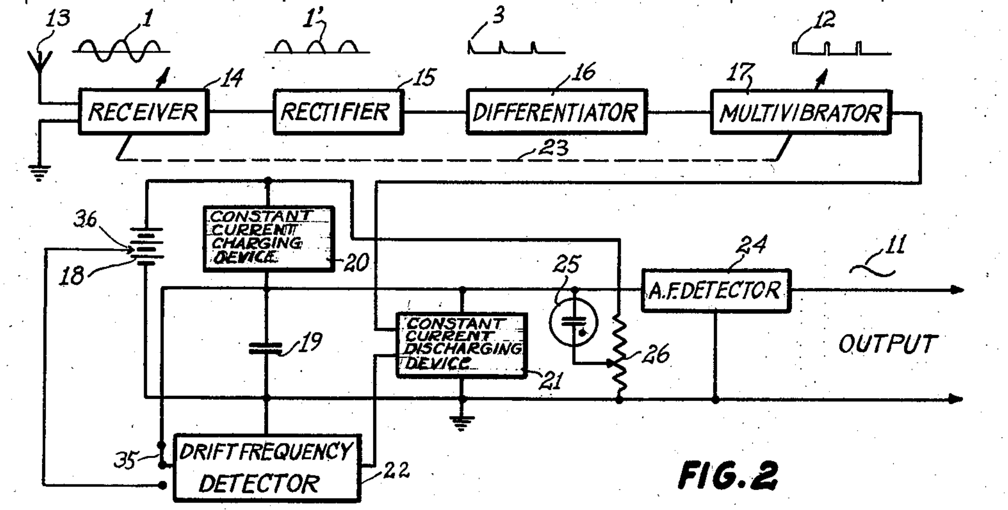
Fig. 2 is a circuit arrangement for carrying the invention into practice.

Fig. 2 shows a circuit arrangement by which the method outlined above may be implemented. An antenna 13 feeds energy corresponding to carrier wave 1 to a receiver 14. A rectifier 15, shown here as a half-wave rectifier, passes only the portion 1′ of wave 1 and applies it to a differentiation circuit 16 which derives therefrom the sharp pulses 3. A multivibrator 17, having a single stable condition, is triggered by these pulses 3 to produce the rectangular pulses 12, the duration of these pulses being determined by the time constants of the multivibrator and being therefore independent of the spacing of pulses 3.

A source of current 18, shown as a battery, serves to charge a condenser 19 by way of a constant current device 20, for example a pentode. A discharge path for the condenser 19 leads over a normally blocked constant current device 21, which may also be a pentode, the unblocking of device 21 occurring by means of the rectangular pulses 12 from multivibrator 17. The current passed by the device 21 in its conductive state will, of course, have to be substantially greater than the current passed by device 20 in order to make the trailing edge of a sawtooth substantially vertical (see Fig. 1c). Furthermore, it will be necessary to adjust the charging and discharging currents for the condenser 19 and the duration of the discharge (i. e. the width of pulse 12) in such a manner that, for a selected carrier frequency, the condenser on receiving an unmodulated carrier will always be discharged to a fixed voltage level as indicated by the line 7 in Fig. 1c.

This may be accomplished by the provision of a detector 22 of very large time constant, termed a drift frequency detector, which is connected across the condenser 19 and by its output controls the conductivity of the constant current device 21 in the unblocked condition of the latter. Thus, should the discharge current through device 21 be insufficient, the mean voltage on condenser 19 will gradually rise whereby the output of detector 22 will become more positive. This output, when applied to a control electrode of the device 21, will serve to decrease the apparent internal resistance thereof, thereby increasing the charge removed from the condenser during each pulse 12 and lowering the input voltage to detector 22. Conversely, should this voltage fall to too low a level when integrated over a period of time corresponding to the time constant of detector 22, the output of the detector will be more negative and the magnitude of the discharge current through device 21 will decrease.

It may be desirable to gang the multivibrator 17 with the receiver 14, as shown in the form of a linkage 23, so that a tuning of the receiver to a particular carrier frequency will at the same time adjust the multivibrator in a manner tending to adapt the period of unblocking of device 21 to the selected frequency. Such adjustment, while liable to be incomplete, should be accurate enough to permit the feedback circuit through detector 22 to take over the control of the condenser discharge so as to prevent a drifting of the sawtooth wave. Since the detector 22 serves to stabilize the mean voltage across condenser 19, the feedback circuit through this detector should have a finite resistance to low frequencies as well as to direct current, thus may be represented by a vacuum tube having galvanically coupled input and output circuits.

The demodulated signal 11 is received at the output of an audio frequency detector 24 connected across the condenser 19.

In order to limit the voltage on condenser 19 in the absence of any carrier wave, it may be advantageous to connect an auxiliary discharge device across the condenser 19. Such a device is shown in Fig. 2 in the form of a glow tube 25 having one electrode connected to the ungrounded terminal of condenser 19 and the other electrode to the slider of a potentiometer 26 which is bridged across the battery 18. The characteristics of the gas filled tube 25 are such that the tube will not be ionized until the condenser voltage is close to that of the battery 18 whereupon the condenser will be discharged instantaneously to a potential substantially below the normal operating potential. Since, in the absence of a suitable input, this process will be repeated indefinitely, the lighting of glow tube 25 will serve as an indication that the phase discriminator is not under the control of a carrier wave.

Figure 3:
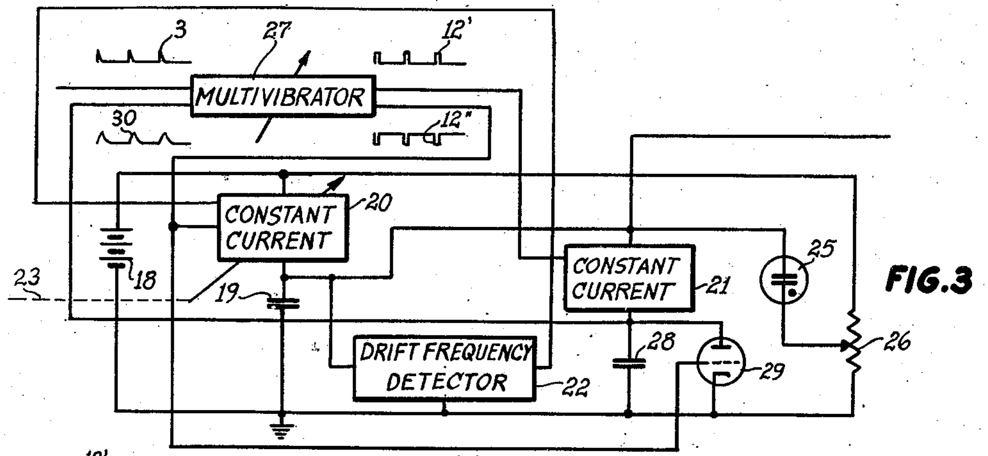
Fig. 3 is a partial modification of the circuit arrangement of Fig. 2.

A modification of part of the circuit shown in Figure 2 is disclosed in Figure 3 wherein elements corresponding to those of Figure 2 have been given the same reference numerals. The multivibrator 17, however, has been replaced by a side-stable multivibrator 27 which is triggered from a first into a second condition by the pulses 3 and triggered back into said first condition by the potential built up on a condenser 28. The appearance of a rectangular pulse 12′ in the output of multivibrator 27 acts to render the constant current device 21 conductive, said device being connected in series with a condenser 28 which thereupon acquires part of the charge of condenser 19. Since the magnitude of the charge acquired by condenser 28 remains constant irrespective of the conductivity of device 21, as will appear hereinafter, the output of detector 22 is in this case applied to a control electrode of constant current device 20. Device 20, which normally charges the condenser 19, is cut off by means of pulses 12″ during the charging of condenser 28, the pulses 12″ being of opposite polarity as pulses 12′ and coinciding with the latter. When the charge on condenser 28 reaches a certain value, the multivibrator is triggered back into its first condition whereupon the pulses 12′ and 12″ cease and the charging of condenser 19 is resumed. During the interval between pulses 12′, 12″ the condenser 28 is fully discharged by means of a triode 29, rendered conductive by the cessation of the negative pulses 12″ which were applied to the control grid thereof.

The operation of the arrangement of Figure 3 will be better understood upon reference to the graphs shown in Figs. 4*a*—4*c*. The trigger pulses 3, Fig. 4*b*, give rise to the leading edge of a rectangular pulse 12′ (Fig. 4*a*) by tripping the multivibrator 27 into its second condition. At the same time the condenser 28 begins to charge along a line 30 (Fig. 4*c*) until the voltage thereon reaches the value 31. At this instant the multivibrator is tripped back into its first condition, signifying the end of pulse 12′ and bringing about the renewed charging of condenser 19 as well as the discharge of condenser 28. The conductivity of triode 29 in the absence of pulses 12″ is such that the condenser 28 discharges almost instantaneously, or at least within a period which is short compared to the interval between pulses 3 as indicated by the line 32, Fig. 4*c*. Since the condenser 28 can only acquire a fixed charge as determined by the voltage limit 31, the decrease in the voltage across condenser 19 will also have a fixed value irrespective of the absolute potential of this condenser.

Under abnormal circumstances it may happen, however, that the multivibrator 27 is triggered into its second condition at a time when the charge on condenser 19 is not high enough to raise the voltage across condenser 28 to the value indicated by the line 31. This is illustrated at 33, Fig. 4*c*. In such an event, which might be due to an abnormally rapid succession of trigger pulses 3, the phase discriminator would remain permanently inoperative unless special precautions were taken to meet this eventuality. This may be done by making the multivibrator 27 only quasi-stable in its second condition, that is by adjusting the multivibrator in such a manner that it will automatically return to its first or normal condition, although only after a time interval which is substantially greater than the normal width of pulses 12′. Pulse 34 (Fig. 4*a*) illustrates how, after a period considerably greater than the duration of a pulse 12′ (see dotted lines), the multivibrator returns to normal to permit the charging of condenser 19 to a suitable potential while condenser 28 discharges. This will again give rise, in due time, to a pulse 12′ of normal width whereupon the operation of the system continues in the manner described, the audio output being derived from the voltage wave built up across condenser 19 in the same manner as in the arrangement of Fig. 2.

It will be observed that the drift frequency detector 22 has a dual function. On the one hand it serves to "latch on" to a particular input frequency selected by the preliminary setting of receiver 14 and multivibrator 17 or 27, respectively. On the other hand it will act to compensate for slow drifts of the input frequency itself by modifying the operation of the phase discriminator circuit accordingly. Even if the detector were unable to respond to these variations without hunting, it will be possible to keep the hunting frequency from the output of the discriminator by a suitable design of detector 24 and/or by connecting a high pass filter in series with the ouput circuit of the latter detector. In order to reduce hunting, the provision of a vernier adjustment for the multivibrator or of a manually adjustable source of corrective potential for some control electrode of constant current device 21 may be desirable.

Finally, a certain stabilizing effect will result from the fact that, in practice, the current-versus-voltage characteristic of the constant current devices 20 and 21 will not be truly horizontal but will rise very slightly with increasing voltages. Thus the conductivity of device 20 will diminish as the voltage across condenser 19 rises from zero toward the potential of battery 18, whereas the conductivity of device 21 will increase the greater this condenser voltage becomes. Hence it will be seen that, given even a rough preliminary adjustment, the effects of the two devices will balance at a point somewhere between ground and battery potential, and it will be merely necessary to adjust the multivibrator in such a manner that this point occur along a substantially linear portion of the characteristic of the two devices 20 and 21. Such balancing will be more likely to occur, thus the preliminary adjustment will have to be less precise, the more the current versus voltage characteristics of devices 20 and 21 (Fig. 2) deviates from a horizontal line; on the other hand, such a deviation will tend to distort the leading and trailing edges, respectively, of the sawtooth wave 4. In the case of Fig. 3, any change in the conductivity of constant current device 21 as a function of voltage will have no effect upon the magnitude of the charge removed from condenser 19, hence will not contribute to a stabilization of the phase discriminator although tending to distort the form of sawtooth wave 4. Stabilization in this case will therefore depend entirely on the conductivity of device 20, this conductivity being also controlled by the output of drift frequency detector 22 in such a manner that more current will pass through the device 20 when the mean voltage across the condenser 19 is low, and vice versa. Also, in Fig. 3, the linkage 23 extending from the tunable receiver 14 is shown connected with the constant current device 20 rather than with the multivibrator 17.

The detector 22 may also be provided with a switch 35, as shown in Fig. 2, for the purpose of eliminating the control action of this detector during the preliminary manual adjustment. Switch 35 is adapted to connect the input of detector 22 to an intermediate tap 36 on the battery 18, point 36 having a potential corresponding to that at or near which it is desired to stabilize the voltage across condenser 19. When the detector has been thus connected, multivibrator 17 is adjusted so that (by virtue of the aforesaid deviations of the characteristics of devices 20 and 21) an operating point is established somewhere between ground and full battery potential. This point may initially lie near one of the extremes of this potential range where the characteristic of either device 20 or device 21 will be markedly non-linear, yet the subsequent reversal of switch 35 will put the automatic control into operation, tending to displace the operating point toward a point defined by the potential of tap 36.

From the foregoing it will be appreciated that a slight deviation of the conductivity of device 20 and (at least in the case of Fig. 2) device 21 from a truly voltage-independent value will be desirable, but that this deviation should be limited from considerations of a resulting distortion of the sawtooth wave 4. Hence the term "constant current device" as used in this description and in the following claims is intended to cover devices having the current-versus-voltage characteristic set forth above.

The invention is not limited to the demodulation of phase modulated carrier waves, but is equally applicable to all instances in which a low-frequency signal is used to modulate the phase of a higher-frequency wave whether the latter be transmitted over a metallic circuit, by direct electromagnetic radiation or through the intermediary of a carrier wave of still higher frequency. Moreover it is to be understood that numerous modifications and adaptations of the forms of the invention herein disclosed will be possible and may readily occur to those skilled in the art without exceeding the spirit and scope of the invention as defined in the objects and in the appended claims.

I claim:

1. The method of demodulating a phase modulated wave which comprises the steps of receiving said wave, deriving from said wave a train of trigger pulses of short duration, the spacing of said pulses corresponding to an integral number of half-periods of said wave, charging a condenser, removing a charge of substantially fixed magnitude from said condenser upon occurrence of each of said trigger pulses, recharging said condenser at a substantially linear rate at least during the intervals between said removals whereby a sawtooth wave of an amplitude varying in proportion with the phase displacement of said modulated wave will be built up across said condenser, varying the magnitude of the charge removed from said condenser in dependence upon the mean voltage across said condenser in such a sense as to counteract any variation of said mean voltage, and detecting the envelope of said sawtooth wave.

2. The method according to claim 1 in which said condenser is discharged by permitting the passage of a discharge current of substantially constant amplitude over a period of time which is short compared to the interval between successive trigger pulses.

3. The method according to claim 1 in which said condenser is discharged by transferring a portion of its charge to another condenser until the voltage across the latter reaches a predetermined limit, and reducing said voltage to a fixed minimum in the intervals between successive trigger pulses.

4. A phase discriminator comprising means for receiving a phase modulated wave, means for deriving from each cycle of said wave at least one trigger pulse occurring when said wave goes through zero, a condenser, a first constant current device connected in series with said condenser, a source of current connected across said device and said condenser in series, a normally blocked second constant current device connected across said condenser, means adapted to unblock said second constant current device upon arrival of each of said trigger pulses so as to effect the discharge of said condenser at a rate considerably faster than that of the charging of the condenser by way of said first constant current device, means for inactivating said unblocking means after the potential on said condenser has dropped by a predetermined amount, a signal detector connected across said condenser to detect the envelope of a sawtooth voltage wave built up across said condenser, and a drift frequency detector having a time constant substantially larger than that of said signal detector, said drift frequency detector being connected to respond to the voltage across said condenser and to apply a control voltage proportional to the mean of said condenser voltage to at least one of said constant current devices, thereby modifying the conductivity thereof in such manner as to compensate for deviations of said mean voltage from an established value.

5. A phase discriminator comprising means for receiving a phase modulated wave, means for deriving from each cycle of said wave at least one trigger pulse occurring when said wave goes through zero, a multivibrator having a stable condition and an unstable condition, means for applying said trigger pulses to said multivibrator so as to trip the same from said stable into said unstable condition, a condenser, a first constant current device connected in series with said condenser, a source of current connected across said device and said condenser in series whereby the condenser will be charged from said source at a substantially linear rate, a second constant current device connected across said condenser, said second device being connected to said multivibrator in such a manner as to be blocked when said multivibrator is in its stable condition and to be unblocked when the multivibrator is in its unstable condition, means for adjusting said multivibrator so that the return into its stable condition occurs after a fixed interval which is short compared to the spacing between successive trigger pulses, the relative conductivity of said two constant current devices being chosen so that the charge passing through said second device during said interval is at least approximately equal to the mean charge passing through said first device between the instants of occurrence of the leading edges of successive trigger pulses, a signal detector connected across said condenser to detect the envelope of a sawtooth voltage built up across said condenser, and a drift frequency detector having a time constant substantially larger than that of said signal detector, said drift frequency detector being connected to respond to the voltage across said condenser and to apply a control voltage proportional to the mean of said condenser voltage to at least one of said constant current devices, thereby modifying the conductivity thereof in such manner as to compensate for deviations of said mean voltage from an established value.

6. A phase discriminator according to claim 5, further comprising means for simultaneously adjusting the time constant of said multivibrator and the tuning of said receiving means so as to adapt the operation of the multivibrator to the particular frequency of the wave received.

7. A phase discriminator according to claim 5 wherein at least one of said constant current devices has a current-versus-voltage characteristic which rises very slightly with increasing voltages whereby stabilization of the mean potential on said condenser will be facilitated.

8. A phase discriminator according to claim 5, further comprising switch means adapted to connect said drift frequency detector alternatively across said condenser and across a source of fixed potential.

9. A phase discriminator according to claim 8 wherein said drift frequency detector is connected to a control electrode of said second constant current device.

10. A phase discriminator comprising means for receiving a phase modulated wave, means for deriving from each cycle of said wave at least one trigger pulse occurring when said wave goes through zero, a multivibrator, means for applying said trigger pulses to said multivibrator so as to trip the same from a first into a second condition, said multivibrator being stable at least in said first condition, a first condenser, a first constant current device connected to said multivibrator so as to be conductive in said first condition of said multivibrator only, said device being connected in series with said condenser, a source of current connected across said condenser and said device in series, a second condenser, a second constant current device connected to said multivibrator so as to be conductive in said second condition of said multivibrator only, the series combination of said second condenser and said second device being connected across said first condenser, means connecting said second condenser to said multivibrator so as to trip back the latter into said first condition when the potential on said second condenser reaches a predetermined limit, the relative conductivity of said two constant current devices being chosen so that the charge passing through said second device during each conductive period thereof is at least approximately equal to the mean charge passing through said first device during each conductive period of the latter, a signal detector connected across said first condenser to detect the envelope of a sawtooth voltage built up across said first condenser, and means for discharging the condenser to a fixed minimum potential during the period of non-conductivity of said second constant current device.

11. A phase discriminator according to claim 10 wherein said multivibrator is unstable in said second condition to such an extent that it will automatically return into said first condition after a period which is larger than the time normally required for charging said second condenser to said predetermined limit.

12. A phase discriminator according to claim 10, further comprising a drift frequency detector having a time constant larger than that of said signal detector, said drift frequency detector being arranged to modify the conductivity of said first constant current device to compensate for deviations of the mean potential on said first condenser from an established value.

13. A phase discriminator according to claim 10, further comprising means for simultaneously varying the conductivity of said first constant current device and the tuning of said receiving means so as to adapt the magnitude of the charging current for said first condenser to the particular frequency of the wave received.

KARL F. ROSS.

REFERENCES CITED

The following references are of record in the file of this patent:

UNITED STATES PATENTS

| Number | Name | Date |
|---|---|---|
| 2,086,918 | Luck | July 13, 1937 |
| 2,191,185 | Wolff | Feb. 20, 1940 |
| 2,284,444 | Peterson | May 26, 1942 |
| 2,323,596 | Hansell | July 6, 1943 |
| 2,408,078 | Labin | Sept. 24, 1946 |
| 2,416,305 | Grieg | Feb. 25, 1947 |
| 2,417,717 | Tellier | Mar. 18, 1947 |
| 2,441,957 | DeRosa | May 25, 1948 |
| 2,467,775 | Posthumus | Apr. 19, 1949 |